United States Patent
Li et al.

(10) Patent No.: US 11,536,357 B2
(45) Date of Patent: Dec. 27, 2022

(54) TRIPLE HARMONIC SPEED REDUCER

(71) Applicant: Leader Harmonious Drive Systems Co., Ltd, Suzhou (CN)

(72) Inventors: Jianwei Li, Suzhou (CN); Yuyu Zuo, Suzhou (CN)

(73) Assignee: Leader Harmonious Drive Systems Co., LTD, Jiangsu (CN)

( * ) Notice: Subject to any disclaimer, the term of this patent is extended or adjusted under 35 U.S.C. 154(b) by 27 days.

(21) Appl. No.: 16/646,006

(22) PCT Filed: Mar. 18, 2019

(86) PCT No.: PCT/CN2019/078454
§ 371 (c)(1),
(2) Date: Mar. 10, 2020

(87) PCT Pub. No.: WO2020/177156
PCT Pub. Date: Sep. 10, 2020

(65) Prior Publication Data
US 2021/0140530 A1   May 13, 2021

(30) Foreign Application Priority Data

Mar. 5, 2019   (CN) .......................... 201910162637.3

(51) Int. Cl.
*F16H 49/00*   (2006.01)

(52) U.S. Cl.
CPC ..... *F16H 49/001* (2013.01); *F16H 2049/006* (2013.01)

(58) Field of Classification Search
CPC .................................................... F16H 49/001
(Continued)

(56) References Cited

U.S. PATENT DOCUMENTS

| 5,782,143 A * | 7/1998 | Ishikawa ............. F16H 55/0833 |
| | | 74/640 |
| 7,412,910 B2 * | 8/2008 | Osle .................... F16H 25/2409 |
| | | 74/424.71 |

(Continued)

FOREIGN PATENT DOCUMENTS

| CN | 101725690 A | 6/2010 |
| KR | 20070073756 A | 7/2007 |

(Continued)

OTHER PUBLICATIONS

M.H.Ivanov, Harmonic Gear Drive, Nov. 1987, all pages, published by National Defense Industry Press, China.
(Continued)

*Primary Examiner* — Ha Dinh Ho
(74) *Attorney, Agent, or Firm* — Vivacqua Crane, PLLC

(57) ABSTRACT

Disclosed is a triple harmonic speed reducer, which enables a flexible inner gear to generate three tooth misalignment motions after a wave generator rotates for one circle, so that the harmonic speed reducer has higher position precision and rotation precision, more stable transmission, and more stable operation. The triple harmonic speed reducer includes a wave generator, a flexspline and a rigid circular spline, wherein the flexspline includes a flexible inner gear and an output part, the wave generator is arranged in an inner installation cavity of the flexible inner gear, the wave generator includes an input shaft end and a cam, wherein a flexible bearing is annularly arranged between an outer ring peripheral surface of the cam and an inner ring peripheral surface of the flexible inner gear, the cam of the wave generator is specifically of a three-convex structure.

5 Claims, 3 Drawing Sheets

(58) Field of Classification Search
USPC .......................................................... 74/640
See application file for complete search history.

(56) References Cited

U.S. PATENT DOCUMENTS 10,106,059 B2 * 10/2018 Wei ...................... B60N 2/2252
10,295,038 B2 *  5/2019 Hsu ...................... F16H 49/001

FOREIGN PATENT DOCUMENTS

KR        20120105349 A    9/2012
WO         2019030843 A1   2/2019

OTHER PUBLICATIONS

Shen Yunwen, Ye Qingtai, Theory and Design of Harmonic Gear Transmission, Sep. 1985, all pages, published by China Machine Press, China.

* cited by examiner

TRIPLE HARMONIC SPEED REDUCER

CROSS-REFERENCE TO RELATED APPLICATIONS

This application is a national stage application under 35 U.S.C. 371 of PCT Application PCT/CN/2019/078454, filed on 18 Mar. 2019, which PCT application claimed the benefit of Chinese Patent Application No. 201910162637.3, filed on 5 Mar. 2019, the entire disclosure of each of which are hereby incorporated herein by reference.

TECHNICAL FIELD

The invention relates to the technical field of harmonic speed reducers, in particular to a triple harmonic speed reducer.

BACKGROUND

A harmonic speed reducer has been widely used in electronics, aerospace, robots and other industries due to the advantages of high carrying capacity, large transmission ratio, small volume, light weight, stable transmission and high transmission precision.

An existing harmonic reducer is that when a wave generator is installed in an inner gear, the inner gear is forced to deform elastically and become elliptical, thus generating two frequencies and generating so-called two tooth misalignment motions, and then achieving the motion transfer between the active wave generator and the flexspline.

However, for the existing harmonic speed reducer structure, because the meshing contact surface between teeth and tooth surface is small in the transmission process, the unit area load is large, resulting in poor transmission stability and poor operation stability. Moreover, because there are only two tooth misalignment motions when the wave generator rotates for one circle, the gear pitch error and accumulated pitch error are relatively large, and the transmission accuracy is relatively low.

SUMMARY

In view of the above problems, the present invention provides a triple harmonic speed reducer which enables a flexible inner gear to generate three misalignment motions after a wave generator rotates for one circle, so that the harmonic speed reducer has higher position precision and rotation precision, more smooth transmission, and more stable operation.

A triple harmonic speed reducer, characterized by comprising: a wave generator, a flexspline and a rigid circular spline, wherein the flexspline includes a flexible inner gear and an output part, the wave generator is arranged in an inner installation cavity of the flexible inner gear, the wave generator includes an input shaft end and a cam, wherein a flexible bearing is annularly arranged between an outer ring peripheral surface of the cam and an inner ring peripheral surface of the flexible inner gear, the cam of the wave generator is of a three-convex structure, three convex ring surfaces are annularly arranged on the outer ring periphery of the cam uniformly, a gradual transition ring surface is provided between every two adjacent convex ring surfaces, the tooth part of the flexible inner gear is meshed with a corresponding outer gear of the rigid circular spline, and the rigid circular spline is fixedly connected to an outer casing by a peripheral connecting flange.

The triple harmonic speed reducer is further characterized in that:

the number of teeth of the outer gear of the rigid circular spline is three more than that of the flexible inner gear;

all the convex ring surfaces of the cam are of the same structure, and all the gradual transition ring surfaces of the cam are of the same structure;

the tooth part of the flexible inner gear corresponding to the concave ring surface is meshed with a tooth part of the outer gear at a corresponding position, the gradual transition ring surface is used to connect two adjacent concave ring surfaces and ensure smooth transition; and the region of the flexible inner gear corresponding to the most concave region of the gradual transition ring surface is a tooth separation region;

the convex ring surface comprises a central most convex point and transition arcs on both sides, and the gradual transition ring surface comprises a central most concave region and gradual transition arcs on both sides, wherein the end of the transition arc on a corresponding side of the convex ring surface is connected with the end of the gradual transition arc on a corresponding side of the gradual transition ring surface;

the output part is of a cup-shaped structure, and the whole harmonic speed reducer is a cup-shaped harmonic speed reducer at this time; and the output part is of a hat-shaped structure, and the whole harmonic speed reducer is a hat-shaped harmonic speed reducer at this time.

After the above technical solution is adopted, by improving the cam structure of the wave generator, the harmonic speed reducer enables the flexible inner gear to generate elastic deformation and present three convexities, to simultaneously mesh the corresponding outer gear at three positions, so that the gear pitch error and accumulated pitch error are smaller, and the position precision and rotation precision are higher than the existing harmonic speed reducer; because the meshing contact surface between teeth and the tooth surface is large and the number of meshed teeth is more than that of the traditional speed reducer in the transmission process, the unit area load is smaller, and the carrying capacity and rigidity are higher than the traditional precise speed reducer; and the triple-frequency precise harmonic speed reducer has more smooth transmission, more stable operation and higher precision.

Figure 1:
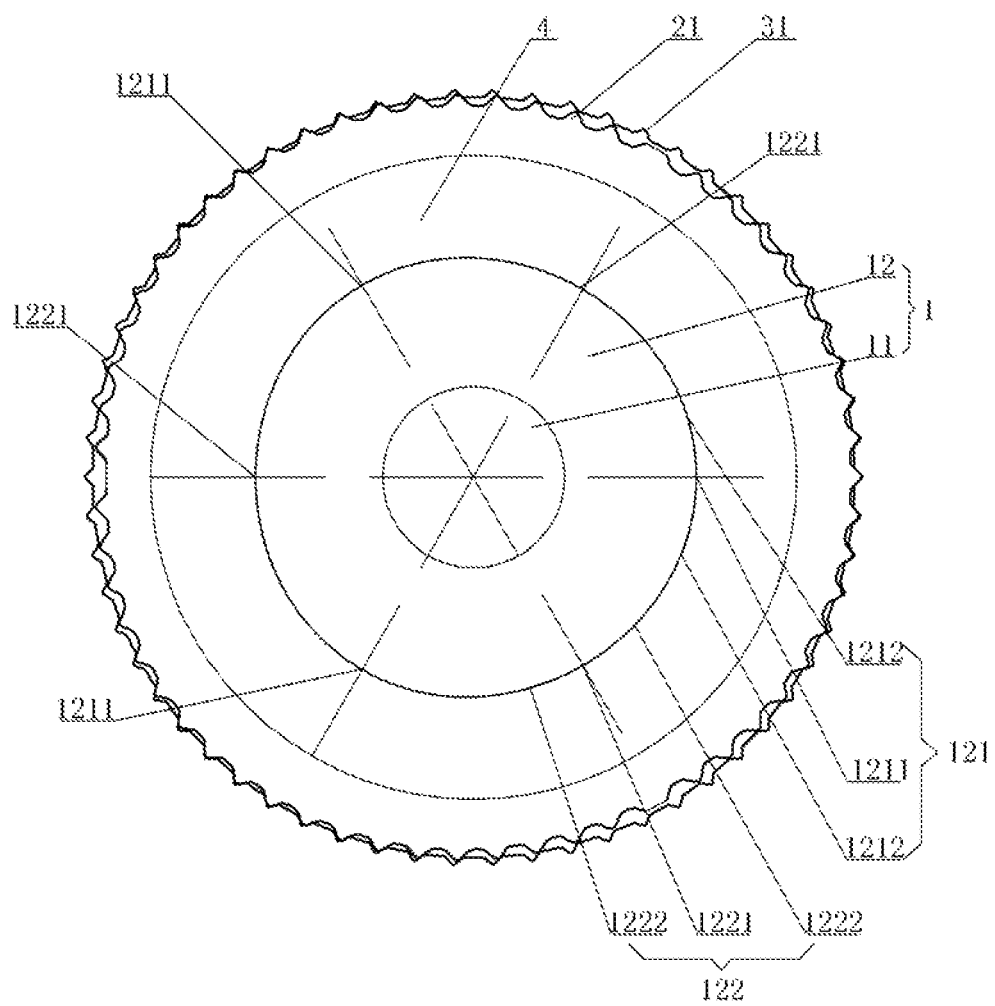
FIG. 1 is a structural schematic diagram of the present invention.

LIST OF REFERENCE NUMERALS wave generator 1; input shaft end 11; cam 12; convex ring surface 121; central most convex point 1211; transition arc 1212; gradual transition ring surface 122; central most concave region 1221; gradual transition arc 1222; flexspline 2; flexible inner gear 21; output part 22; rigid circular spline 3; outer gear 31; connecting flange 32; flexible bearing 4.

DETAILED DESCRIPTION

Figure 2:
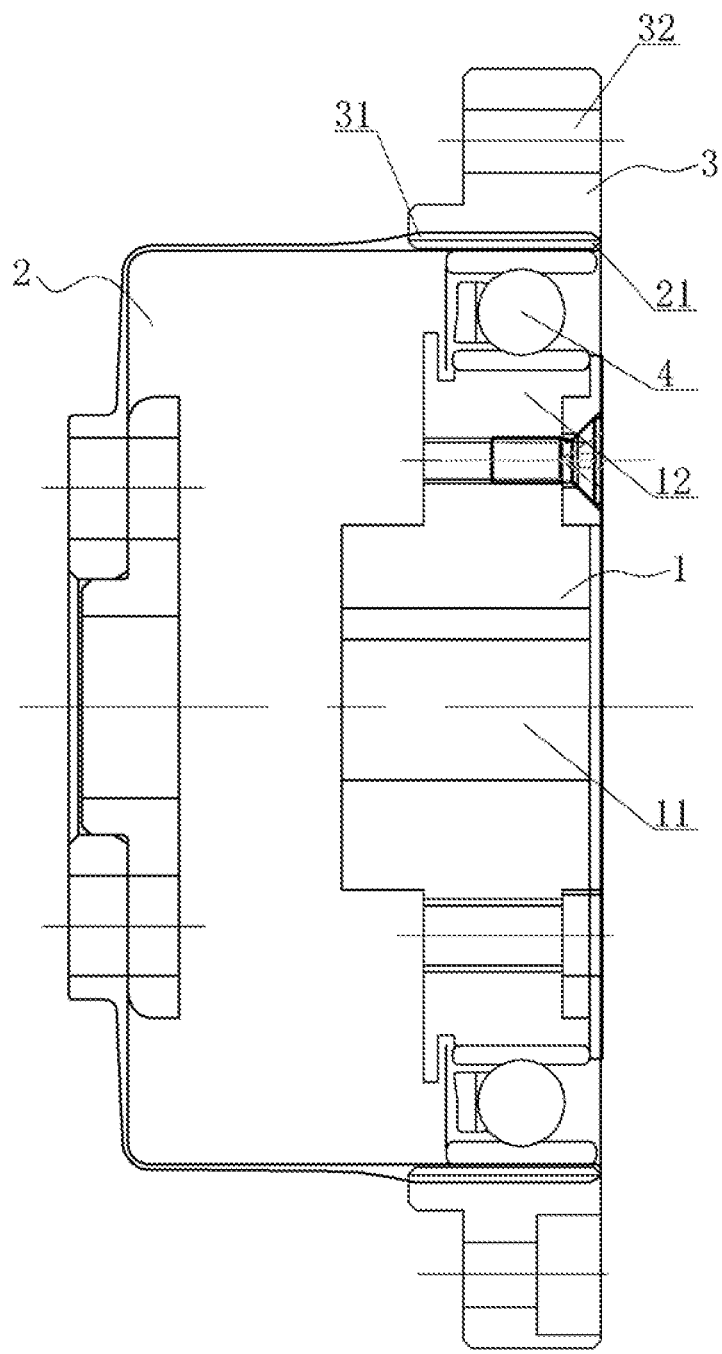
FIG. 2 is a structural diagram of embodiment 1 of the present invention.
Figure 3:
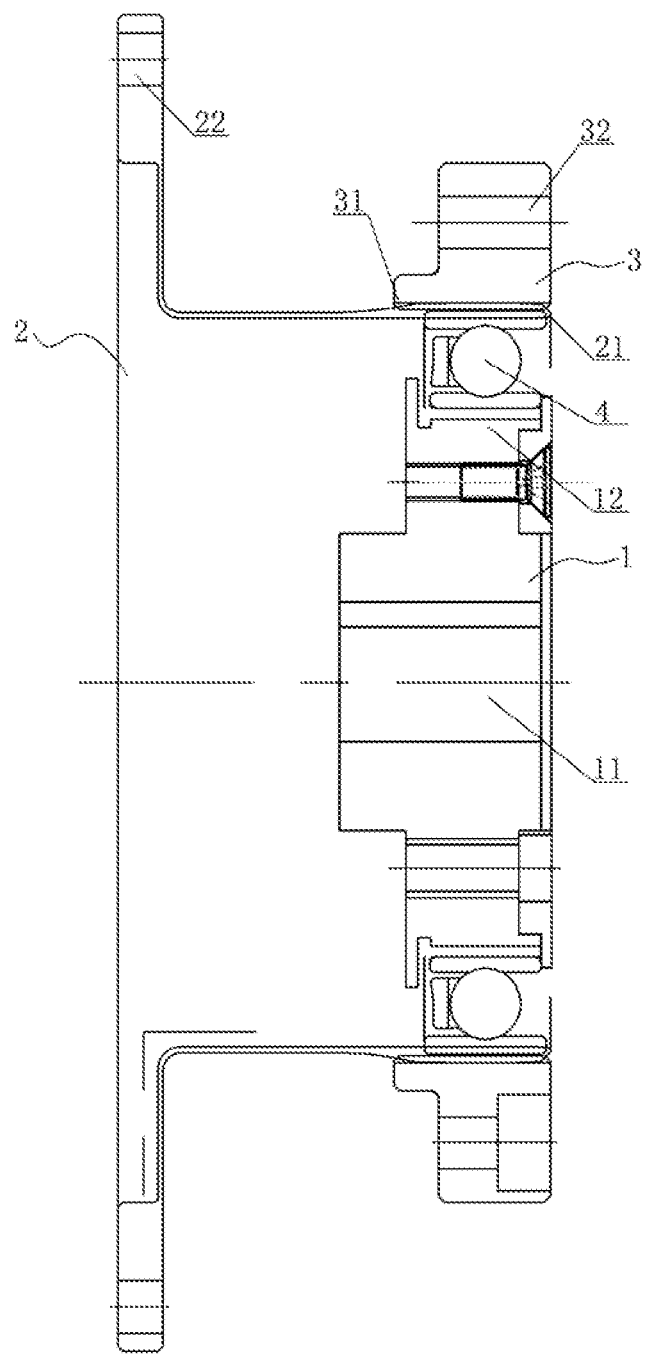
FIG. 3 is a structural diagram of embodiment 2 of the present invention.

As shown in FIGS. 1-3, a triple harmonic speed reducer, comprising: a wave generator 1, a flexspline 2 and a rigid circular spline 3. The flexspline 2 includes a flexible inner gear 21 and an output part 22. The wave generator 1 is arranged in an inner installation cavity of the flexible inner gear 21. The wave generator 1 includes an input shaft end 11 and a cam 12, and a flexible bearing 4 is annularly arranged between an outer ring peripheral surface of the cam 12 and an inner ring peripheral surface of the flexible inner gear 21. The cam 12 of the wave generator 1 is of a three-convex structure. Three convex ring surfaces 121 are annularly arranged on the outer ring periphery of the cam 12 uniformly. A gradual transition ring surface 122 is provided between every two adjacent convex ring surfaces 121. A tooth part of the flexible inner gear 21 is meshed with a corresponding outer gear 31 of the rigid circular spline 3. The rigid circular spline 3 is fixedly connected to an outer casing by a peripheral connecting flange 32.

The number of teeth of the outer gear 31 of the rigid circular spline 3 is three more than that of the flexible inner gear 21;

all the convex ring surfaces 121 of the cam 12 are of the same structure, and all the gradual transition ring surfaces 122 of the cam 12 are of the same structure;

the tooth part of the flexible inner gear 21 corresponding to the concave ring surface 121 is meshed with a tooth part of the outer gear 31 at a corresponding position, the gradual transition ring surface 122 is used to connect two adjacent concave ring surface 121 and ensure smooth transition; the region of the flexible inner gear 21 corresponding to the most concave region of the gradual transition ring surface 122 is a tooth separation region; and the convex ring surface 121 comprises a central most convex point 1211 and transition arcs 1212 on both sides, the gradual transition ring surface 122 comprises a central most concave region 1221 and gradual transition arcs 1222 on both sides, wherein the end of the transition arc 1212 on a corresponding side of the convex ring surface 121 is connected with the end of the gradual transition arc 1222 on a corresponding side of the gradual transition ring surface 122.

Embodiment 1: As shown in FIG. 2, the output part 22 is of a cup-shaped structure, and the whole harmonic speed reducer is a cup-shaped harmonic speed reducer at this time.

Embodiment 2: As shown in FIG. 3, the output part 22 is of a hat-shaped structure, and the whole harmonic speed reducer is a hat-shaped harmonic speed reducer at this time.

By improving the cam structure of the wave generator, the harmonic speed reducer enables the flexible inner gear to generate elastic deformation and present three convexities, to simultaneously mesh the corresponding outer gear at three positions, so that the gear pitch error and accumulated pitch error are smaller, and the position precision and rotation precision are higher than the existing harmonic speed reducer; because the meshing contact surface between teeth and tooth surface is large and the number of meshed teeth is more than that of the traditional speed reducer in the transmission process, the unit area load is smaller, and the carrying capacity and rigidity are higher than the traditional precise speed reducer; and the higher-frequency precise harmonic speed reducer has more smooth transmission, more stable operation and higher precision.

The specific embodiments of the present invention are described in detail above; however, the embodiments described above are just preferred embodiments of the present invention and are not intended to limit the implementation scope of the present invention. All equivalent changes and improvements made in accordance with the application scope of the present invention shall fall within the scope of this patent.

The invention claimed is:

1. A triple harmonic speed reducer, comprising:
    a wave generator;
    a flexspline and a rigid circular spline;
    wherein the flexspline includes a flexible inner gear and an output part, the wave generator is arranged in an inner installation cavity of the flexible inner gear, the wave generator includes an input shaft end and a cam, wherein a flexible bearing is annularly arranged between an outer ring peripheral surface of the cam and an inner ring peripheral surface of the flexible inner gear, the cam of the wave generator is of a three-convex structure, three convex ring surfaces are annularly arranged on the outer ring periphery of the cam uniformly, a gradual transition ring surface is provided between every two adjacent convex ring surfaces, a tooth part of the flexible inner gear is meshed with a corresponding outer gear of the rigid circular spline, and the rigid circular spline is fixedly connected to an outer casing by a peripheral connecting flange;
    wherein all the convex ring surfaces of the cam are of the same structure, and all the gradual transition ring surfaces of the cam are of the same structure; and
    wherein the convex ring surface comprises a central most convex point and transition arcs on both sides and the gradual transition ring surface comprises a central most concave region and gradual transition arcs on both sides, wherein the end of the transition arc on a corresponding side of the convex ring surface is connected with an end of the gradual transition arc on a corresponding side of the gradual transition ring surface.

2. The triple harmonic speed reducer of claim 1, characterized in that the number of teeth of the outer gear of the rigid circular spline is three more than that of the flexible inner gear.

3. The triple harmonic speed reducer of claim 1, characterized in that the tooth part of the flexible inner gear corresponding to the concave ring surface is meshed with a tooth part of the outer gear at a corresponding position, the gradual transition ring surface is used to connect two adjacent concave ring surfaces and ensure smooth transition; and a region of the flexible inner gear corresponding to a most concave region of the gradual transition ring surface is a tooth separation region.

4. The triple harmonic speed reducer of claim 1, characterized in that the output part is of a cup-shaped structure, and the harmonic speed reducer is a cup-shaped harmonic speed reducer.

5. The triple harmonic speed reducer of claim 1, characterized in that the output part is of a hat-shaped structure, and the harmonic speed reducer is a hat-shaped harmonic speed reducer.

* * * * *